Feb. 12, 1952   C. M. MORTON   2,585,400
FEEDER FOR FOWLS
Filed July 30, 1948   2 SHEETS—SHEET 1

INVENTOR:
CLYDE M. MORTON
BY
ATTORNEYS.

Feb. 12, 1952
C. M. MORTON
2,585,400
FEEDER FOR FOWLS
Filed July 30, 1948
2 SHEETS—SHEET 2
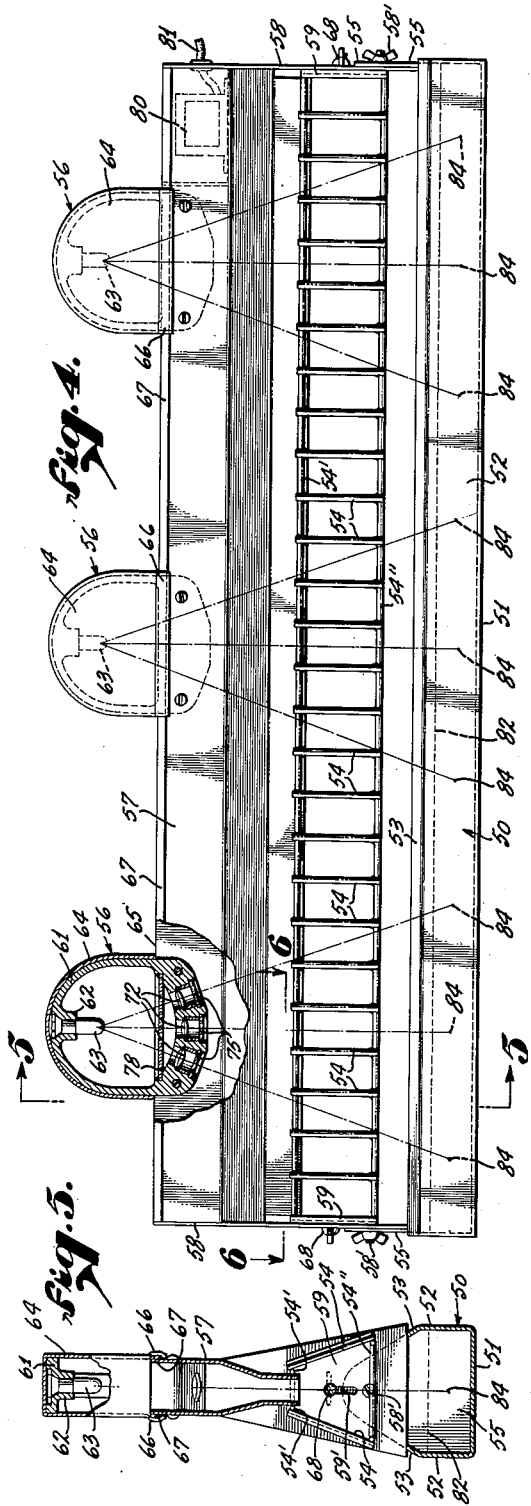
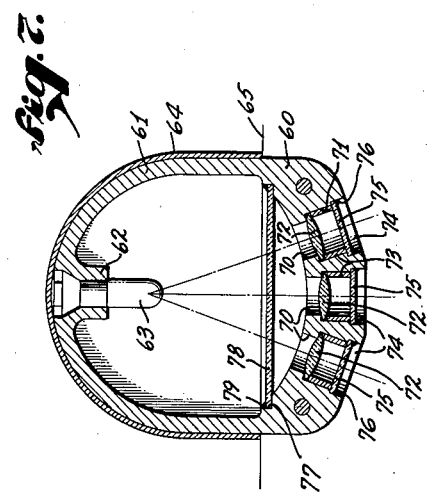
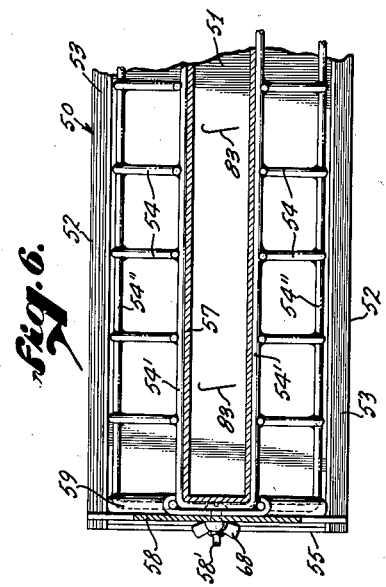
INVENTOR:
CLYDE M. MORTON
BY Huebner, Maltby
and Beehler
ATTORNEYS.

Patented Feb. 12, 1952

2,585,400

UNITED STATES PATENT OFFICE 2,585,400

FEEDER FOR FOWL

Clyde M. Morton, Hawthorne, Calif.

Application July 30, 1948, Serial No. 41,626

16 Claims. (Cl. 119—51)

The invention relates to feeders of a type especially well adapted to encouraging the feeding of young fowl which because of one peculiarity or another are reluctant to feed properly and adequately to the extent that the mortality rate of the young fowl is prohibitively high.

Certain types of birds or fowl of the gallinaceous variety produce young which for the first few days or weeks of their existence have difficulty eating enough feed either to keep them alive or to build up sufficient resistance so that they will develop into healthy birds. A notable example of young fowl which experience considerable difficulty in feeding are young turkeys to which the name of poult has been given. The young turkey poult is commonly known to be particularly reluctant to feed. The precise reasons are not generally understood but the birds are thought to be born with defective eyesight to the extent that the newly born poults cannot identify feed much further away than the reach of their beaks. Young turkey poults are also stupid to the extent that even when actually placed in a mass of feed many of them seen unable to consume enough of the feed to keep them from starving or to build up enough resistance so that they will later survive.

Certain turkey raisers recognizing this difficulty spread feed over the floor and permit the young birds to mill around in the feed in order to have enough feed at close enough range so that the young birds will consume it. Although this expedient has some tendency to reduce the mortality rate in the young fowl, it is productive of other bad effects in that droppings from the birds contaminate the feed and results in an unhealthy condition. Although some birds feed sufficiently when placed upon a mass of feed other birds, perhaps born weaker, may be crowded around to the extent that they are unable to consume enough of the feed to keep them from starving. Still other young turkey poults appear to lack the intelligence which prompts them to feed and are found to mill about aimlessly with their heads high instead of foraging for feed as do the young of other types of fowl. A further disadvantage lies in the fact that young turkey poults are particularly cautious to the extent that they can be induced only with great difficulty to extend their heads between guard rails. This makes it extremely difficult to devise feeders which the fowl will use and which at the same time can be kept clean.

On the other hand it has been found that young fowl and particularly young turkey poults are curious and more or less quickly attracted by sound, movement and bright objects. In recognition of this tendency some feeders in the past have resorted to the practice of mixing foreign objects like marbles too large to be eaten with the feed with the expectation that the young fowl attempting to pick at the objects will inadvertently consume some of the feed in which the objects are mixed.

Reliable statistics indicate that the mortality rate of young turkey poults in those States of the Southwest where the raising of turkeys has been relatively successful is as high as 10% during the first three to four weeks after birth, whereas in other portions of the country where conditions are less favorable the mortality rate is over 25%.

Young turkey poults must start eating within three days in order to avoid dying of starvation. Those which eat inadequately survive in a weakened condition and many die somewhat later. It is further true that the longer the young fowl remains alive in a weakened condition the greater the loss is to the raiser under circumstances where the young fowl dies eventually. Therefore, it is highly desirable to provide some means for inducing the young fowl to eat immediately and in quantity so that the mortality rate may be lowered as much as possible and so that the young fowl from the start build up a resistance which will assist a large percentage of them maturing into full-grown, healthy birds.

It is therefore an object of the invention to provide a new and improved feeding device particularly adapted to feeding of young fowl which is capable of inducing the fowl to feed more promptly and in greater quantity than the fowl would naturally feed itself under ordinary conditions.

Another object of the invention is to provide a new and improved feeding device which takes advantage of natural tendencies of young fowl to be attracted by something unusual and utilizing the impulse of the young fowl to draw it to a necessary feeding process.

Still another object of the invention is to provide a new and improved feeding device which is efficient in the placing of feed within feeding reach of the young fowl, which is effective in inducing the fowl to feed early and constantly, which is positive in its attraction of the fowl to the feed and which is sufficiently inexpensive in construction and operation so as to make possible widespread use in the poultry raising industry.

Still another object of the invention is to provide a new and improved feeding device for young fowl which are ordinarily reluctant to feed properly which will positively induce an increased rate of natural feeding and which will at the same time make it possible to keep the feed clean and sanitary at all times.

Still further among the objects of the invention is to provide a convenient and portable feeding device large enough to accommodate young fowl in large quantities and which can be moved about to wherever the fowl may be fed most advantageously, the structure comprising the feeder being so designed that it can be accommodated to fowl of any kind and which can be kept in continuous operation for as long as the critical feeding period lasts.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 4 is an elevational view partly broken away showing a second form of the device.

Figure 5 is a vertical sectional view of the device taken on the line 5—5 of Figure 4.

Figure 6 is a sectional view of an end portion of the device shown in Figure 4 taken on the line 6—6.

Figure 7 is an enlarged vertical sectional view of one of the lamp housings illustrated in Figure 4.

Figure 1:
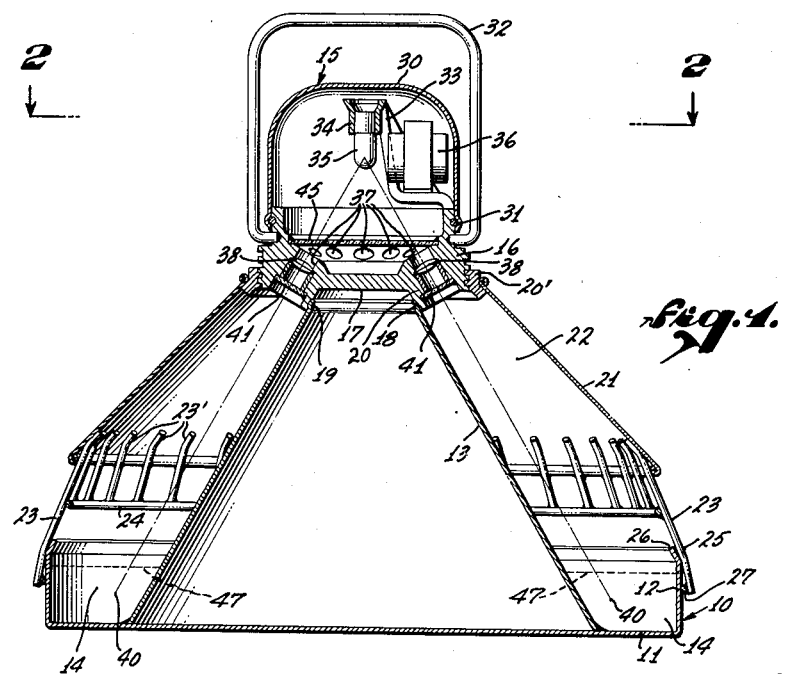
Figure 1 is a vertical sectional view of one form of the device.

In the embodiment illustrated in Figure 1 there is incorporated a pan 10 having a bottom 11 and a side wall 12. As is apparent from Figure 2 the base is circular in form. For convenience the bottom wall 11 extends over the entire lower portion of the device but centrally disposed within the base is a frusto-conical member 13, smaller in diameter at its base than the diameter of the wall 12, so that there is provided between the base of the frusto-conical member and the wall 12 an annular feed retaining tray or channel 14, the inner wall of which slopes outwardly.

In this particular embodiment a lamp housing indicated generally by the reference character 15 is shown located at the top of and supported by the frusto-conical member 13. The lamp housing comprises several parts including a base 16 which has a depression 17 on the bottom side in the wall of which is a recess 18 adapted to receive a beaded portion 19 at the top of the frusto-conical member. The housing rests and is secured to the frusto-conical member so that the housing and shade may be lifted as a unit. Surrounding the base is an annular downwardly extending ring-like projection 20, threaded on the outer surface and threadedly supported upon the outer surface of the projection is a threaded collar 20' which is adapted to receive and support a shade 21 likewise frusto-conical in form by means of an annular lip or flange 21'. The shade is supported by the threaded collar and extends downwardly over the upper portion of the conical member providing a space 22. The top of the shade is defined by a beaded portion which slides freely over the exterior of the threaded collar 20' so that the shade may be lifted clear at any time.

The top ends of guides 23 and also of guard strips 23' are secured by welding or soldering to the underside of the lower portion of the shade 21, whereas lower portions 25 of the guides are firmly attached to a reinforcing and spacing ring 27 and may rest upon an upper turned-in portion 26 of the side wall 12 when the shade is in lowermost position. The guard strips 23' are relatively large in number spaced apart radially about the shade 21 preferably at distances too narrow to admit the head of the young fowl. A ring 24 serves to secure the guard strips at suitable intervals and the ring 24 is normally located above the top of the side wall a distance sufficient to admit the head but not the shoulders of the feeding poult. The intent is to have the poult feed beneath the ring 24. As the poult grows larger the ring 24 and the shade may be progressively lifted by rotation of the threaded collar 20' about the threaded annular projection 20. As noted above spaces between the guides are ordinarily made wide enough for the fowl to see through only.

Above the base 16 of the lamp housing is a hood 30 retained upon the base by means of a snap ring 31. A handle 32 may be provided for ease in lifting and manipulating the device.

Mounted upon the base by means of a bracket 33 is a lamp socket 34 designed to receive a lamp 35 which may if preferred be a projection type lamp. The lamp suggested is one in which the lamp filament is condensed at a single point from which all of the illumination emanates. It is in effect a spot or point source of light. A transformer 36 may be included in order to accept line voltage and transform it into a suitable voltage for the particular lamp which is utilized where proper lamps of commercial line voltage are not available.

In the base 16 there are provided a plurality of apertures 37 which extend obliquely outwardly through the annular ring-like projection 20. It is interesting to observe that the axes of the apertures 37 are substantially parallel to the wall of the frusto-conical member and the wall of the shade 21. A line drawn from the spot of incandescence in the projection type lamp 35 through the axis of the aperture 37 in each case interests the bottom of the pan 10 within that portion of the pan heretofore identified as the tray 14. As shown this has substantially the form of a relatively narrow annular trough.

By means of the apertures 37 light emanating from the lamp may be directed between the top of the frusto-conical portion and the inside wall of the shade 21 to a point at the bottom of the tray or trough 14.

In the absence of any focusing device the spot of light coming from the aperture 37 would ordinarily be relatively large. This is not the effect desired, however, in that a very small, very bright spot on the feed is more attractive to the young fowl than a larger spot not as bright.

To make certain that a small bright spot is reproduced in the tray where the feed will be placed, there is provided in the aperture 37 a lens 38 which may be glass, plastic or some other material so selected with respect to its characteristics that when placed at an advantageous location between the ends of the aperture 37 in each case will form an image of the filament of the projection type lamp either on the upper surface of the bottom 11 or at some such location as the point 40 which could be a point located at about one-half of the depth of feed ordinarily placed in the trough.

It is clear that if a lens of this sort in each of the apertures 37 is to operate efficiently and effectively at all times the lens must remain relatively clean so that its focus is sharp. On the other hand, considerable dust arises from the feed during the course of feeding and dust of some sort or other is apt to permeate the air in the feed house most of the time that the feeder is in use. Consequently some ready and easy means should be provided to prevent the lens from becoming dust laden or else to provide a protection to keep the dust away from the lens, which protection may be readily cleaned.

A convenient means of protecting the lens on the outside consists of the employment of a flat glass pane 41 located in an enlarged portion 42 of the aperture. A sealing ring 43 may be utilized between the pane and lens for holding the lens in place. The flat pane may be sealed by some suitable material 44 around the edge and is preferably located near enough to the lower surface of the ring 20 to facilitate ease in cleaning. The lens of course never becomes dirty because of being retained in a sealed aperture.

On the other or inside end of the apertures 37 there may be provided a common protecting sheet of glass 45 or other suitable transparent material which overlies all of the apertures. This pane may be sealed around an edge 46 and thus mounted provides a single means for catching dust or dirt which might accumulate and which holds the dust or dirt at a location which is easy to clean. The hood 30 may be easily removed by pressure against the snap ring 31 in order to gain access to the interior of the lamp housing.

In operation the feeding device is ordinarily set on the floor of the feed house where young fowl and particularly where young turkey poults may be fed. A mass of feed in placed within the tray 14 to a considerable depth initially, that is to say about as deep as the dotted line 47. The projection type lamp 35 is then illuminated and the filament of the projection type lamp will be focused at approximately the points 40, it being understood that each lens 38 will produce a distinct and separate image of the filament. The purpose primarily is to reproduce in the area of the mass of feed a small very bright spot which will attract the attention of the feeding young fowl. In the particular embodiment 12 such images are reproduced, they being located close enough together that one bird standing approximately midway between two adjacent images would be able to reach its neck between the guard strips and peck at either of the images. Good practice also indicates that the image at sharpest focus may be preferably midway between the maximum and minimum depth of the mass of feed so that there will always be a relative bright focus point at the surface of the feed regardless of the depth. Inasmuch as the reproduced image is nothing more than light, young birds can peck directly at the image and as they do so will naturally consume such particles of feed or mesh as may lie beneath the image. As the level of the feed lowers the feed will fill in to some extent from the sides in the direction of the image so that throughout almost all of the feeding time there will be some feed beneath the image. Occasional agitation of the mass of feed will assist in distributing the remaining mass about the tray so that the location of the images will be most effective. It is also advantageous to employ the shade 21 so that the area of brightness is confined as much as possible to single points in the mass of feed in order that reflected brightness from other parts of the feeding device will not distract the attention of young birds of such faulty eyesight as to need this type of feeding inducer.

After each feeding if desired the shade 21 and guard strips 23' may be lifted entirely free of the tray and the lamp housing. More feed may then be readily poured into the tray. At the same time easy access is had to the panes 41 to permit them to be dusted off.

On those occasions where dust accumulates on the pane 45, the hood 30 may be snapped free of the base 16 and the pane 45 dusted or washed clean.

In the embodiment of the invention illustrated in Figures 4 through 7, inclusive, the same principle is utilized but in that embodiment an elongated feeding device is utilized instead of a circular device.

As shown in the modified form there is provided a tray or trough 50 having a bottom 51 and side walls 52 which are bent over at the top edges 53. The tray may also include end walls 55. In this instance no interior portion is provided but instead a series of lamp housings 56 are mounted upon walls of a shade 57, the shade in turn being supported upon plates 58. The plates are shown attached to the end walls 55 of the tray by bolts and wing nuts 58'. Guard or guide strips 54 extend in spaced relation throughout both sides of the tray and are held together at the tops by a wire ring or reinforcing bar 54' and at the bottoms by a wire ring or reinforcing bar 54". The wire ring 54' is designed to extend around and be guided by the lower part of the shade 57. In normal position the ring 54" at the bottoms of the guide strips 54 will be spaced above the top edge of the walls 52 a distance sufficient to permit the heads but not the bodies of the young fowl to pass. To facilitate lifting the ring and guide strips, plates 59 are attached at the ends. Slots 59' in the plates 59 are adapted to accommodate bolts and wing nuts 68 which, extending through the plates 58, may be used to hold the rings and guide strips in a more elevated position as the feeding fowl continue to grow bigger.

In this embodiment the lamp housing may comprise a base 60 having an upper arch-like frame 61 at the top of which is provided a lamp socket 62 for mounting a lamp 63. A hood 64 may be provided with such shape and construction as to entirely envelope that portion of the lamp housing above a top surface 65 of the shade 57. The hood may include a flanged lower portion 66 adapted to snap over a rim or bead 67 along the top of the shade.

As is more readily apparent in Figure 7 the base 60 may include three apertures 70 extending in different directions downwardly toward the center of the tray. The arrangement of apertures accounts for distribution of light from the lamp 63 at approximately the path illustrated by the dot and dash lines in Figure 4. This is arbitrarily set so that there is more or less equal distribution of the images of the lamps throughout the length of the tray.

In the lamp housing of Figure 7 similar to that of the embodiment first described, the apertures 70 have recessed portions 71 at the bottoms of which are lenses 72 held in place by sleeves or collars 73. Outer recessed portions 74 are adapted to receive and retain panes 75 of clear glass sealed in place around the edges 76.

On the inner side of the base there is provided a shoulder 77 adapted to receive a rectangular pane 78 of clear glass sealed at the edges 79.

Where special lamps 63 are utilized a single transformer 80 supplied from a service line 81 with current of the usual voltage and amperage may supply all of the lamps 63 in a single feeding device with electricity of the proper characteristics.

In the utilization of the feeder of the form illustrated in Figures 4 through 7 feed is placed in the tray 50 to about the depth illustrated by the dotted line 82. The lamps are then illuminated and because of the location of the lenses 72 and their characteristics, images 83 of the filaments of the lamps 63 are reproduced somewhere near the elevation 84 which is within the mass of feed in the tray. The images of the filaments are bright spots in the mass of feed at which the young fowl will peck.

Figure 2:
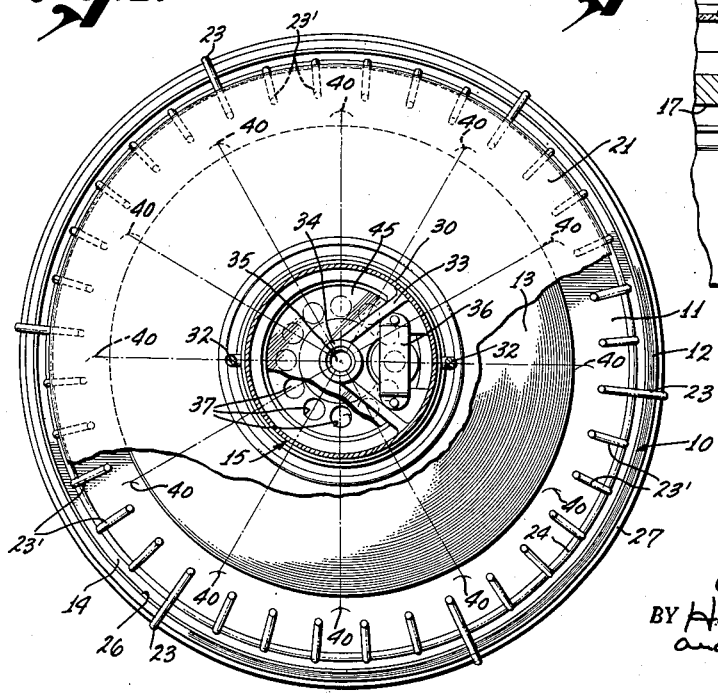
Figure 2 is a top view partly in section of the device taken on the line 2—2 of Figure 1.
Figure 3:
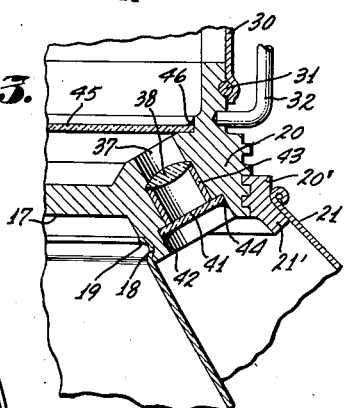
Figure 3 is a fragmentary sectional view of an upper portion of the device.

By utilization of conventional lenses of special characteristics and orientation, as for example lenses of forms commonly designated in optical parlance as prisms, what may be virtually a single sharp bright line may be produced extending throughout the length of the straight tray or extending entirely around the annular tray of Figures 1 and 2.

It will be appreciated that the primary intent and operation of the structure herein described is the production of bright images or bright spots within the mass of the feed. Although as herein described in detail lamp filaments reproduced by lenses to create images have been emphasized, it is contemplated that other specific means may be utilized with equal effectiveness for the same purpose, namely, the production of sharp, bright, light images on the mass of feed which are visible to the young fowl and that the claims should be interpreted with sufficient breadth to encompass variations in the means of producing such images which are within the purport of the invention.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A feeding device for young fowl comprising a tray having a length substantially greater than the breadth thereof, a spot source of illumination, a closed container for said source of illumination mounted above the tray provided with a plurality of light outlets from said closed container facing different parts of the tray and including means operatively associated with said outlets adapted to direct portions of said spot source of illumination upon a plurality of spots in said tray.

2. A feeding device for young fowl comprising a tray for retaining a mass of feed within feeding reach of said young fowl, a lamp housing supported above the tray and a source of illumination in said lamp housing, said lamp housing being provided with a plurality of openings facing different parts of the tray, means in said openings adapted to direct said spot source of illumination upon said different parts of the tray, and transparent dust shields sealed over the outsides and insides of the openings.

3. A feeding device for young fowl comprising a tray for retaining a mass of feed within feeding reach of said young fowl, a frame above the tray, a lamp housing on the frame and a spot source of illumination in said lamp housing, said lamp housing being provided with a plurality of openings facing different parts of the tray, means in said opening adapted to focus said spot source of illumination upon said different parts of the tray, transparent dust shields sealed over the lenses on the outside and the inside of the lenses, and means providing access to the interior of the housing.

4. A feeding device for young fowl comprising a tray for retaining a mass of feed within feeding reach of said young fowl, a frame above the tray, a lamp housing on the frame and a spot source of illumination in said lamp housing, said lamp housing being provided with a plurality of openings facing different parts of the tray, lenses located in said openings in accordance with the lens characteristics for focusing said spot source of illumination upon said different parts of the tray, transparent dust shields sealed over the lenses on the outside of the housing and a transparent shield on the inside common to all said lenses sealed on the interior of the housing inside with respect to the lenses, and means providing access to the interior of the housing.

5. A feeding device for young fowl comprising a tray for retaining a mass of feed at a location within reach of young fowl standing outside the tray, guard means mounted on the device above the tray, a light shade mounted above the tray having a lower edge substantially coinciding with the guard means, at least one lamp and a housing therefor mounted above the shade having at least one aperture therein between the housing and the interior of the shade including a lens at a position focusing light beneath the shade upon the tray.

6. A feeding device for young fowl comprising an annular tray for retaining a mass of feed, said tray having an inside wall in the form of a frusto-cone and an outside wall, the uppermost end of said frusto-cone being above the top edge of the outside wall, a lamp housing secured to one of said walls and mounted above said frusto-cone, a lamp therein, a shade extending outwardly and downwardly from the housing, said shade being spaced from and outside said frusto-cone and forming a passage for light to the tray, and a plurality of focusing outlets in the housing directed through said passage toward respective portions of the tray.

7. A feeding device for young fowl comprising an annular tray for retaining a mass of feed, said tray having an inside wall in the form of a frusto-cone and an outside wall, the uppermost end of said frusto-cone being above the top edge of the outside wall, a lamp housing at the top of said frusto-cone, a lamp therein, a shade supported upon and below the housing and outside said frusto-cone, guard strips between the shade and the top of the outside wall, and a plurality of light focusing devices in the housing directed toward respective portions of the tray having protecting transparent covers, said housing having a removable hood above the location of said focusing outlets.

8. A feeding device for young fowl comprising a tray for retaining a mass of feed at a location within reach of young fowl standing outside the tray, a light shade mounted above the tray, a plurality of lamp housings supported above the tray, a lamp in each housing and a plurality of light focusing devices in each housing adapted to direct light beneath the shade at spaced location spots in the tray.

9. A feeding device for young fowl comprising a tray for retaining a mass of feed at a location within reach of young fowl standing outside the tray, guard strips above the tray, a light shade mounted above the guard strips and above the tray, a plurality of lamp housings supported above the shade, a lamp in each housing and each housing being provided with a series of apertures having lenses therein in a position focusing light beneath the shade at spaced location spots in the tray.

10. A feeding device for young fowl comprising a tray for retaining a mass of feed at a location within reach of young fowl standing outside the tray, a lamp housing mounted above and supported by the tray, a frame comprising upright spaced guard strips and a reinforcing bar attached to the lower ends of the guard strips secured between the lamp housing and the tray, means associated with the tray and the housing for mounting the reinforcing bar in spaced relation to the top of the tray, and an adjusting mechanism cooperable with said means connecting the frame to a stationary portion of the feeding device adapted to hold said reinforcing bar in different positions of adjustment relative to the top of the tray.

11. A feeding device for young fowl comprising a tray for retaining a mass of feed at a location within reach of young fowl standing outside the tray, a lamp housing mounted above and supported by the tray, a shade mounted below the lamp housing, a frame between the lower part of the shade and the tray comprising upright spaced guard strips and upper and lower reinforcing bars attached to the guard strips, means for mounting the upper ends of the guard strips adjacent the shade and the lower reinforcing bar in spaced relation to the top of the tray, and an adjusting mechanism cooperable with said means and connecting the frame to a stationary portion of the feeding device adapted to hold said lower reinforcing bar in different positions of adjustment relative to the top of the tray.

12. A feeding device for young fowl comprising a tray for retaining a mass of feed at a location within reach of young fowl standing outside the tray, a shade secured above and supported by the tray, said shade forming a chamber above the tray and having a position wherein a lower edge of the shade forms a space between the shade and an upper edge of the tray through which the interior of the tray is visible from the outside, a light housing combined with said tray having a light aperture therein at a location removed from a direct line of vision from points exterior to the tray through said space, and a light in said housing adapted to illuminate the interior only of the tray and shielded by said shade from the exterior.

13. A feeding device for young fowl comprising a tray for retaining a mass of feed at a location within reach of young fowl standing outside the tray, a shade secured above and supported by the tray, said shade forming a chamber above the tray and having a position wherein a lower edge of the shade forms a space between the shade and an upper edge of the tray through which the interior of the tray is visible from the outside, guard means interposed in said space dividing said space into apertures smaller than the bodies of said young fowl, a light housing combined with said tray having a light aperture therein at a location removed from a direct line of vision from points exterior to the tray through said space, and a light in said housing adapted to illuminate the interior only of the tray and shielded by said shade from the exterior.

14. A hooded and lighted feed trough for young fowl comprising a downwardly extending hood, a source of artificial light beneath the hood adapted to artificially illuminate a feeding area having a limit determined by the hood, a tray beneath the hood having a feed receiving portion including the feeding area within the limits thereof, said tray forming a support for said hood, said hood and a wall at the outside of the tray being spaced apart forming an aperture removed from a direct line of vision between points exterior of the tray and the source of artificial light, said space providing an access area for feeding not greater than the bodies of the young fowl and providing means through which the artificially illuminated area within the tray is visible from the exterior 15. A feeding device for young fowl comprising a feed container, a light generating device mounted on and above the container and a light director between the generating device and the container arranged to direct a high intensity light spot on the surface of the mass of feed.

16. A feeding device for fowl comprising a feed container, guard means around the container adapted to prevent ingress of the feed and bodies of said fowl upon the feed, a light generating device mounted on and above the container and a light focusing medium between the generating device and the container adapted to project a high intensity light spot on the surface of the mass of feed.

CLYDE M. MORTON.

REFERENCES CITED

The following references are of record in the file of this patent:

UNITED STATES PATENTS

| Number | Name | Date |
|---|---|---|
| 1,384,785 | Shepard | July 19, 1921 |
| 1,610,176 | Stabler | Dec. 7, 1926 |
| 1,650,965 | Seikman | Nov. 29, 1927 |
| 1,662,204 | Parkhurst | Mar. 13, 1928 |
| 1,793,431 | Pelmulder | Feb. 17, 1931 |
| 1,830,689 | Badenhop | Nov. 3, 1931 |